United States Patent [19]

Barr

[11] Patent Number: 4,576,261
[45] Date of Patent: Mar. 18, 1986

[54] SAFETY PARKING BRAKE FOR AUTOMATIC TRANSMISSIONS

[75] Inventor: William A. Barr, Gibson Island, Md. 21056

[73] Assignees: William A. Barr Memorial Trust; Barr-Scarlett Trust; Barr-Truitt Trust, all of Gibson Island, Md. ; by William A. Barr, trustee, part interest to each

[21] Appl. No.: 741,203

[22] Filed: Jun. 4, 1985

Related U.S. Application Data

[63] Continuation of Ser. No. 585,397, Mar. 2, 1984, abandoned, which is a continuation-in-part of Ser. No. 485,513, Apr. 15, 1983, abandoned.

[51] Int. Cl.[4] ............................................. B60K 41/26
[52] U.S. Cl. ..................................... 192/4 A; 74/411.5
[58] Field of Search ...................... 192/4 R, 4 A, 4 C; 74/411.5, 475, 477; 188/31, 69; 180/82 A, 77 R

[56] References Cited
U.S. PATENT DOCUMENTS 3,601,231 8/1971 Kolacz ................................ 192/4 A
3,703,941 11/1972 Ohie ..................................... 192/4 A
4,413,712 11/1983 Richard .............................. 192/4 A

OTHER PUBLICATIONS

Automatic Transmission Park System Review, Ford Motor Co., Dec. 20, 1978.

*Primary Examiner*—George H. Krizmanich
*Attorney, Agent, or Firm*—Scrivener Clarke Scrivener and Johnson

[57] ABSTRACT

Sudden accidental unintended movement of an automatic transmission into reverse with the engine running is prevented by modifying the usual control rod to provide a cam surface so positioned thereon that as the control rod is moved a predetermined distance from reverse towards park a spring loaded member engages the cam surface and both restrains unintended movement of the control rod back to reverse and positively drives the control rod into its full park position as soon as the parking pawl aligns with a space between teeth of a parking gear. The mechanism may be assembled as original equipment in conventional transmissions or added to existing transmissions with little or no modification in design.

11 Claims, 6 Drawing Figures

SAFETY PARKING BRAKE FOR AUTOMATIC TRANSMISSIONS

This application is a continuation of application Ser. No. 585,397, filed Mar. 2, 1984, now abandoned, which is a continuation-in-part of Ser. No. 485,513, filed Apr. 15, 1983, now abandoned.

This invention relates to automatic transmissions for vehicles and more particularly to safety means for preventing an automatic transmission from suddenly moving from park into reverse as a result of accidental positioning by the driver of the shift lever intermediate its reverse and park positions while the engine is running.

Automatic transmission for vehicles are almost invariably provided with a parking gear connected to an output shaft of the transmission. When the vehicle is to be parked, the driver moves the shift lever from a drive or neutral position past a reverse position and into its park position. For every position of the shift lever except park, a spool valve is moved to direct flow of pressure fluid within the transmission to control vehicle drive. When parking, the spool valve is first moved from its reverse to a non-drive position and the shift lever operates some form of a control rod for driving a cam, often in the form of a cone carried by or attached to the control rod, against a parking pawl to move it against an opposing bias force towards the parking gear. Because more often than not the pawl engages the surface of a tooth rather than the space between two teeth of the gear, provisions must be made for enabling the driver to move the shift lever into its full park position when the pawl engages a tooth. The means for accomplishing this is some form of yielding spring which bears against the cone or cam to urge it towards the pawl when the shift lever is moved into its park position, with the spring collapsing when the pawl hangs up on a tooth surface but after the vehicle drifts a slight distance to align the space between two teeth on the parking gear with the pawl the spring expands against the cone or cam to drive and retain the pawl in its parked position between two teeth.

The above described arrangement is satisfactory provided the driver moves the shift lever into its full park position. Sometimes, however, the driver is careless and moves the shift lever sufficiently to ensure that the reverse valve is moved out of its reverse position, thus stopping the vehicle but he does not move the lever fully into park. Under these circumstances, when the pawl engages the outer surface of a tooth and the vehicle does not drift a slight additional amount yieldable means can anchor on the now-fixed pawl and react in the opposite direction against the cam or control rod to drive the mechanism from its partially parked position to its reverse position thus causing the vehicle to move suddenly and unexpectedly in reverse.

The foregoing problem has been recognized and numerous law suits have been instituted against automobile manufacturers resulting in the awards of costly damages. Heretofore attempts to combat the problem have involved a re-design of the gates or slots into which the driver moves the shift lever for the various vehicle functions, particular attention being given to the slots for reverse and park which are invariably adjacent each other. These re-designs were intended to induce the driver at the shift lever end of the mechanism to make certain that the shift lever was fully engaged in the park slot when the vehicle was to be parked, but these re-designs have failed to eliminate the problem and accidents and litigation continue.

The broad object of the present invention is to combat the above described problem, not be re-designing the shift lever slots at the driver's end of the mechanism, but by redesigning the mechanism at the transmission end of the system so that the yielding spring described above always operates to exert a force on the cam and/or control rod in the direction of their full park position following movement of the shift lever a predetermined amount towards park.

More specifically, it is an object of the invention to arrange the yielding resilient means so that if it should anchor on the pawl or cam with the shift lever moved only partially towards its full park position, the resilient means always acts, first, to restrain the mechanism from moving from a partially parked position towards reverse and, second, always urges the mechanism towards its full park position.

In my prior co-pending application Ser. No. 363,680 filed Mar. 29, 1982 and continued as application Ser. No. 631,793 filed July 17, 1984, I provide an arrangement whereby the pawl is at all times biased towards the gear rather than away from it. The cone or cam is reversed from its usual disposition in conventional transmission parking arrangements and when the control rod is moved towards park it moves the cam away from the spring loaded pawl, rather than towards it, so that the pawl, when engaged with the outer surface of the tooth, tends to drive the cam and control rod towards park rather than towards reverse, and it is thus virtually impossible for the system in a partially parked condition to move accidently from that condition to reverse. Though the arrangement of the application is quite satisfactory for its intended purpose, it could require costly alteration in existing transmissions in order to incorporate the invention therein.

In another co-pending application Ser. No. 485,514 filed Apr. 15, 1983 now abandoned and refiled as a continuation-in-part application Ser. No. 528,863 filed Sept. 2, 1983 I disclose yet another arrangement for preventing the above accidents.

Another aim of the present invention, therefore, is to provide an arrangement for accomplishing the same purpose as in my pending applications but which can be incorporated in newly built transmissions with minimal and perhaps no change in basic design or can ben added to existing transmissions without requiring any dismantling of the transmission itself or any of its operating linkages, and can even be applied to the exterior of the transmission housing at a reasonable cost.

Other objects and their attendant advantages will become apparent as the following detailed description is read in conjunction with the accompanying drawings wherein.

Figure 1:
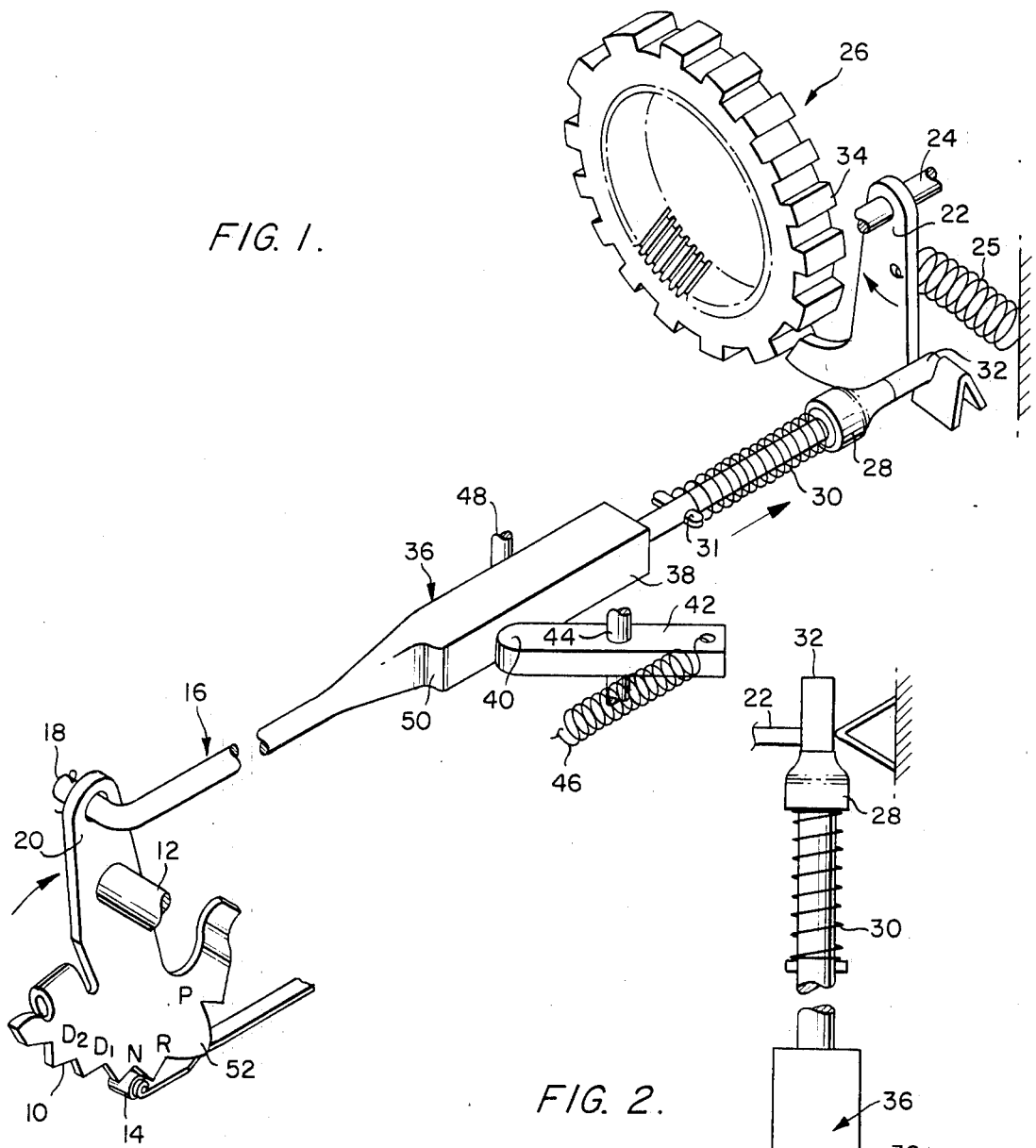
FIG. 1 is a broken perspective view showing conventional detent plate operable by the driver controlled shift lever and showing one form of the present invention incorporated in the control rod for the parking brake.

Turning now to the drawings FIG. 1 illustrates the salient components of a well known system for controlling an automatic transmission between various drive, including reverse, and park positions. For driving and reverse a detent plate 10 having a plurality of notches, marked $D_2$, $D_1$, N,R and P, on the periphery thereof is pivotally mounted by a shaft 12 to the interior wall portions of a vehicle automatic transmission housing (not shown). The detent plate has connected thereto in known fashion the end of a spool valve (not shown) which is moved linearly within the transmission to control pressure ports which determine the drive to the vehicle wheels. The shaft 12 is connected by a series of linkages (not shown) to the shift lever (not shown) readily accessible to the vehicle driver. When the operator moves the shift lever to any one of the drive or reverse positions the detent plate and spool valve are moved to a corresponding position and retained in that position by a spring loaded detent 14 which engages the appropriate notch in the detent plate. The foregoing can be and is referred to in the claims as "driver operated means".

The park position of the detent plate is invariably adjacent to reverse so that when one wishes to park the vehicle from a forward drive position, he first brings the vehicle to a halt with the service brakes and then moves the shift lever from a drive position past neutral and reverse into park position. As the detent plate moves towards its park position it moves the spool valve to an inoperative position so that power is no longer transmitted to the vehicle wheels and, at the same time, a control rod 16 having an end 18 connected to an arm 20 of the detent plate, is moved axially in the direction of a pawl 22 which is pivoted at 24 within the transmission housing and biased by a spring 25 away from a toothed parking gear 26 connected to the output shaft (not shown) of the transmission.

Slideably carried on the control rod is a cam member 28 in the form of a cone which is urged at all times by a yielding spring 30 disposed between the cone 28 and a stop 31 on the control rod against an axially extending end portion 32 of the control rod which defines a stop for the cone 28.

As so far described, the mechanism is conventional and as those skilled in the art know, when the shift lever is moved to its park position the control rod is advanced by the detent plate until the cam 28 enages the outer edge of the pawl to urge it against the opposition of the bias spring 24 towards the parking gear 26. Should the pawl be aligned with the space between two teeth so that the pawl enters that space, the vehicle is parked but should the pawl engage the radial outer surface 34 of a tooth, as is the usual case, then the cam hangs up on the stopped pawl but the driver can still move the shift lever into its full park position because the spring 30 yields to permit the rod to move to its full park position while the cam is retained out of that position until the space between two teeth are aligned, by slight drift of the vehicle, with the pawl whereupon the cam is snapped forwards by the spring 30 to drive the pawl into its full park position.

As explained above, in conventional systems not employing the present invention, should the driver carelessly not move the shift lever into its full park position, it is possible, for the detent plate to be positioned intermediate its park and reverse positions where, if the engine is still running, the spool valve is placed in a neutral position to remove power to the wheels and the cam is driven by the control rod to bear against the pawl, where, if it engages the outer radial face of a tooth, as is likely and the vehicle were not to drift a slight distance to align the pawl with the space between two teeth, it is possible for the cam spring 30 to react against the cone, which is now anchored on the pawl, to apply sufficient force to the stop 31 on the control rod to drive it and the detent plate from its intermediate position back to its reverse position thus causing the vehicle to move suddenly in reverse.

The present invention eliminates or at least significantly reduces the likelihood of such accidents occurring by modifying the control rod 16 so that instead of its being a rod of uniform diameter from end to end, an intermediate portion 36 thereof is shaped to provide an element having a linear surface 38 which is slidably engaged by the rounded end 40 of a member comprising a lever 42 pivoted at a point 44 remote from the end 40 to the interior of the transmission housing and urged by a spring 46 operating on the opposite end of the lever so that the rounded end 40 of the lever 42 is in close sliding abutment with the linear surface 38 for every position of the control rod except park. Lateral movement of the control rod due to the force of the lever acting thereon is resisted by a suitably positioned guide member 48 which may include roller. At the end of the liner surface 38 proximate to the detent plate 10 is a step or shoulder 50 which, as the detent plate is moved from reverse to park is engaged by the end 40 of the lever 42 to urge the control rod towards its park position.

Figure 2:
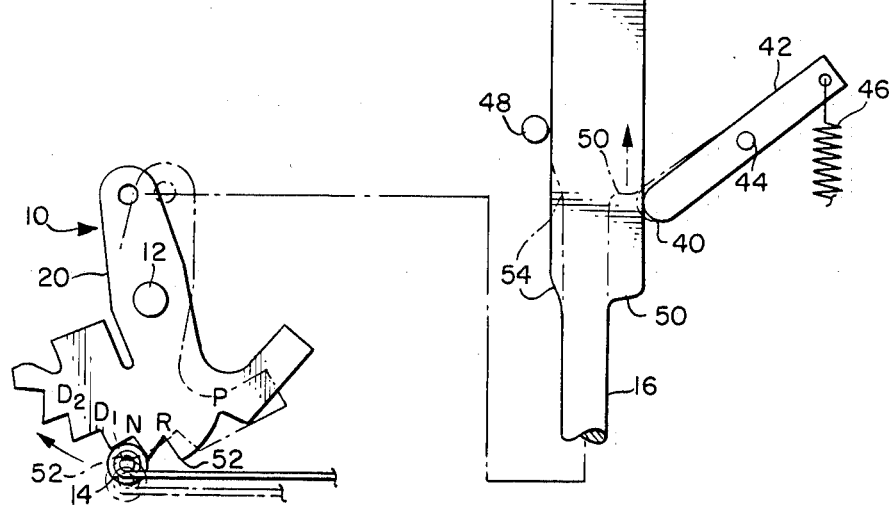
FIG. 2 is a schematic side elevational view showing the control rod as it moves from a drive position towards its park position.
Figure 3:
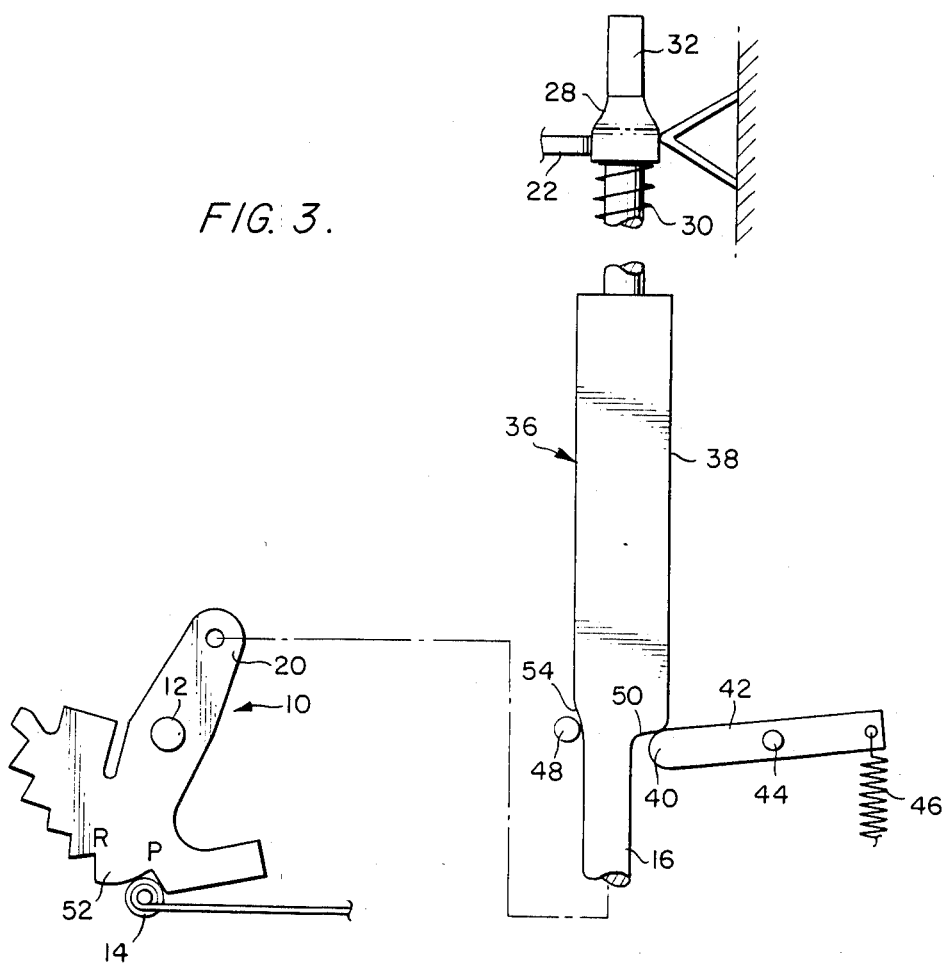
FIG. 3 is a view similar to FIG. 2 showing the control rod in its full park position.

The operation of the embodiment of FIG. 1 should be clear from FIGS. 2 and 3. In full lines in FIG. 2, the control rod is shown in the same position as in FIG. 1, that is to say, in the neutral position. Regardless of whether the detent plate is in a drive, neutral or reverse position, the lever end 40 rides on the linear surface 38 and has virtually no effect on the operation of the shift system except to urge the rod laterally against the guide 48 which may be equipped with anti-friction means so that any lateral force on the control rod is substantially undetectable.

The step 50 is located along the length of the linear surface at the point where the detent 14 starts to ride down the outer end of the projection 52 on the detent plate 10 separating the park and reverse notches.

FIG. 2 purports to show the relationship of the step 50 to the projection 52, it being seen that as the detent 14 starts to slide down the face of the projection 52 leading to the bottom of the park notch the lever end 40 begins to engage the step 50 and begins to exert a force on the control rod in the direction of park. Because the driver will almost invariably move the shift lever more than just to the point where the detent starts its slide down the face of the projection 52, any movement beyond that point allows the lever to exert a greater moment on the control rod which moment increases as the lever 42, either by itself or with the assistance of the shift lever, moves the control rod increasingly towards park, there being a point at which prior to the invention, sufficient instability existed, that accidental reversal could occur, but at which point, with the invention, that instability is eliminated and the control rod is restrained from movement back to the reverse position. Considered in another way, the invention creates, in effect, an opposite fail-safe instability whereby the linkage system is urged or forced into park by action of the spring loaded lever despite the carelessness of the driver.

As can be best seen in FIG. 3 where the control rod has been urged into its full park position by the lever 42, there is provided on the sides of the rod opposite the step 50 a shallow step 54 which engages the guide member 48 to aid in retaining the control rod in its full park position.

Figure 6:
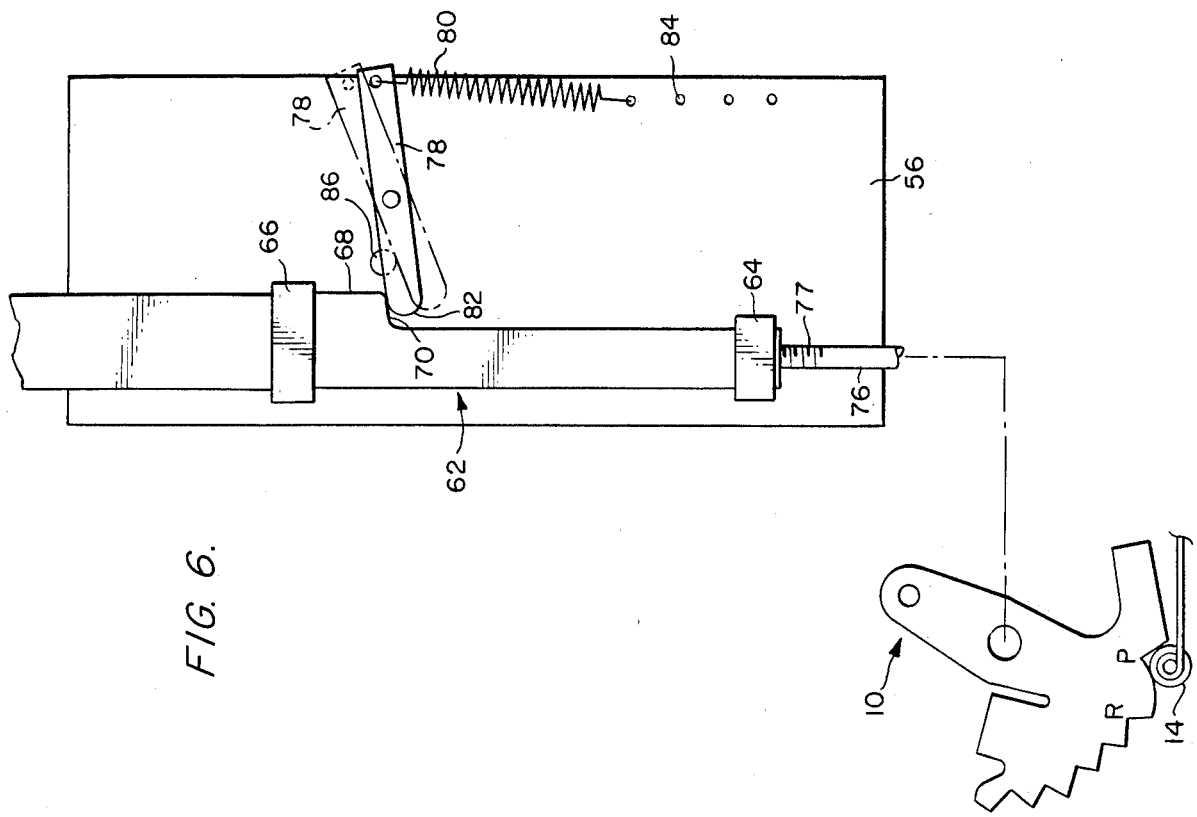
FIG. 6 shows the modification of FIGS. 4 and 5 in its full park position.

The embodiment of FIGS. 1 through 3 is well suited to incorporation in original equipment transmissions as they are assembled, substantially the only design changes being the control rod and mountings for the guide 48 and pivot lever 42. The embodiment of FIGS. 4 through 6 is adapted to be added to existing, already installed transmissions without requiring entry of any kind into the transmission housing.

Figure 4:
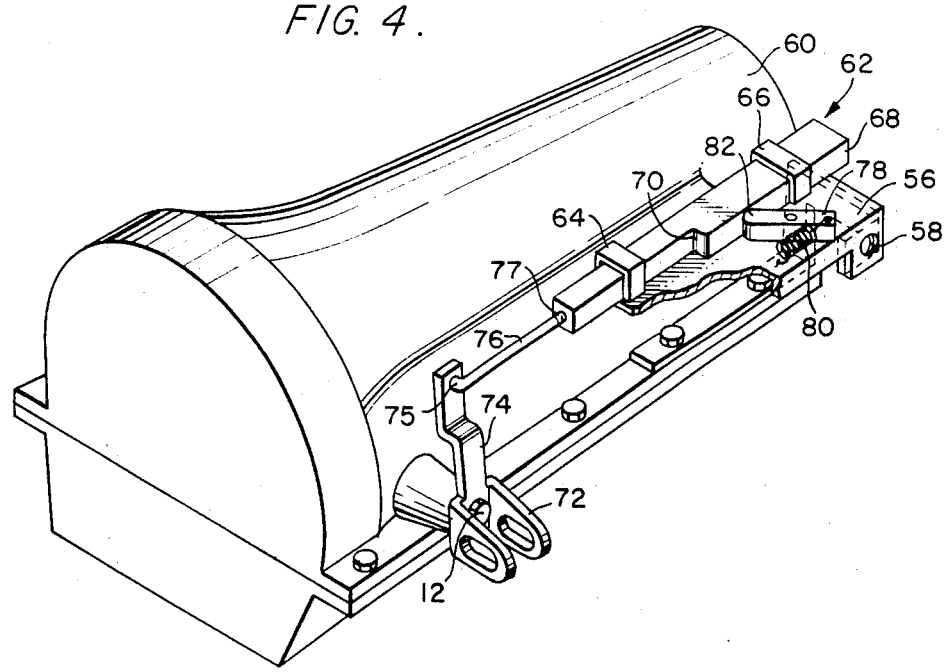
FIG. 4 shows a modification of the invention applied as a separate unit to the exterior of the transmission housing.

With particular reference to FIG. 4, it will be seen that instead of the invention being incorporated into and made an integral part of the control rod, there is provided a separate assembly designed for attachment to the exterior of the transmission housing. The assembly comprises a platform 56 pivotally mounted by a pivot pin 58 to the exterior of the transmission housing 60. A member 62 having on one side edge a profile similar to that on the control rod 38 of the FIG. 1 embodiment, is slidably mounted on the surface of the platform 56 and may be linearly guided by a pair of inverted U-shaped brackets 64, 66. The member 62 has a linear surface 68 and step or shoulder 70 at the end of the surface 68 proximate to the clevis-like member 72 which is connected by suitable linkages (not shown) to the driver controlled shift lever in a conventional manner for operating the shaft 12 of the detent plate as explained in connection with FIG. 1. It happens that on some existing clevis members there is already provided an arm 74 as shown in FIG. 4 for the purpose of accommodating an alternative connection to the shift lever but if such an arm should not be already supplied, then, for the purposes of the present invention, a clevis having such an arm would have to be provided. Connected to the arm 75 is the L-shaped end 75 of a rod 76 having a screw threaded connection 77 at its opposite end with the end of the slide member 62 for a purpose which will be explained. Pivoted to the surface of the platform 56 is a lever 78 corresponding in configuration and function to the lever 42 of the embodiment of FIG. 1, and, as in FIG. 1, a spring 80 urges the rounded end 82 of the lever 78 into close sliding engagement with the linear surface 68 of the slide member 62. When the shift lever is moved towards its park position the end 82 of the lever engages the shoulder 70 of the slide member to ensure that the clevis member is not only restrained from moving back to reverse but may be driven to its full park position in the event that the driver fails to move the shift lever into its full park position.

The threaded connection 77 of the rod 76 with the slide member 62 permits adjustment of the slide member so that the shoulder 70 can be positioned at the optimum location relative to the position of the detent plate as it is moved from its reverse to its park position. As with the first embodiment the lever 78 should start to engage the shoulder just as the detent starts to slide from the peak of the projection between the reverse and park notches towards to the bottom of the park notch. Because of manufacturing tolerances this may require some slight adjustment for each transmission though obviously precise positioning is not necessary so long as the shoulder is engaged after the peak of the projection has passed beyond the detent, which can be determined simply by manual operation of the clevis from reverse to park by an assembler without removing the transmission housing 60. The assembly of the FIGS. 4 through 6 embodiment is pivotally mounted at 58 in order to follow the arc described by the end of the arm 74 when the clevis 72 is moved to its various positions.

Figure 5:
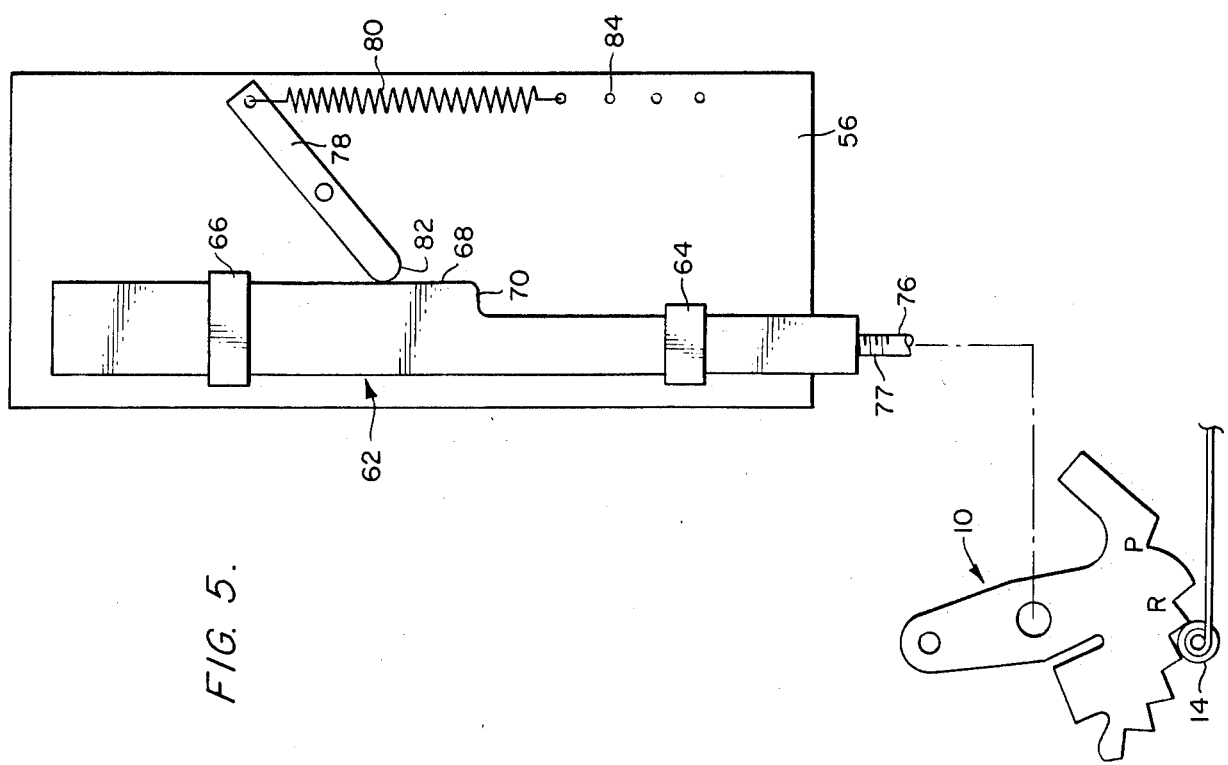
FIG. 5 shows the modification of FIG. 4 in a typical drive position.

FIG. 5 illustrates the relation of the lever 78 to the slide member 62 for every position of the shift lever and detent plate except park. FIG. 6 illustrates the positions of the lever 78 relative to the step or shoulder 70 when the slide member and detent plate are in their full park position.

It will be understood that it may be desirable to provide in the FIGS. 1-3 modification a threaded connection for adjustment purposes similar to the connection 77 in the FIGS. 4-6 modification. If necessary the tension on the spring 80 may be adjusted to the proper degree by the provision of a series of openings 84 in the platform as shown in FIGS. 5 and 6.

Though no separate housing is shown enclosing the mechanism of FIG. 4, it should be understood that such a housing is desirable and, indeed, would form an integral part of the assembly in order to protect the components from dirt and moisture. Where the rod 76 or end of the slide projects out of the housing, known sealing means can be employed to exclude dirt and moisture from the interior of the housing.

A distinct advantage of the invention is that in the event of failure of any part of the mechanism, say the springs 46, 80, this has no effect on the operability of the transmission and the only result would be to remove the safety feature of the invention.

In achieving safety by the invention there may be a minor trade-off in that more force than formerly may be required to move the shift lever from park to a drive position since the opposing force of the levers 42, 78 must be overcome. Though clearly the force exerted by springs 46, 80 when the levers 42, 78 are engaged with their respective shoulders must be greater than the yielding cam springs 30, the additional shifting effort from park to drive should not be substantially greater than the additional force required to move the shift lever into its full park position against the opposition of the cam spring 30 when the pawl engages the radial surface of a tooth in a conventional transmission not equipped with the present invention. With the invention, however, the driver receives an assist in moving the shift lever towards park which offsets to some degree the opposing force of the yieldable cam spring 30 when the cam does hang up on the surface of a tooth.

Should, however, the force of the lever springs 46, 80 excessively impede initial movement of the control rod away from park, this problem can be alleviated by the provision of means for limiting the effect of the lever on the control rod to a predetermined major proportion of but less than the total travel of the control rod into a full park position whereby the initial movement of the driver operated means, that is to say the control rod or cam, away from park is substantially unimpeded by the lever. After such initial movement, the pawl then bears on a steeper part of the cam so that opposition to further movement of the control rod away from park becomes less noticeable to the driver as the cam withdraws entirely from its engagement with the pawl.

The reduction of the effect of the lever on the control rod in its movement towards park (and hence a consequent reduction of the opposition of the lever away from park) can be accomplished simply by the addition of a stop, such as that shown in phantom at 86 in FIG. 6, in the path of movement of the lever, the stop being located so as to be engaged by the lever after the control rod has been moved about 65 to 75% of its distance towards full park. With such an arrangement, there would be no opposition offered by the lever for the first 25 to 35% of the movement of the control rod away from park yet the lever will always be in a position to prevent the return of the control rod to reverse should this unlikely event take place after the rod has been moved either by the driver or by the lever at least 65 to 75% of the distance towards park.

Another means for removing or reducing the effect of the lever in opposition to movement away from park is by selecting the rate of the lever spring in conjunction with its point of connection with one end of the lever relative to its pivot and the other end of the lever where it bears on the cam surfaces of control rod as in in FIG. 2 of the element 62 as in FIG. 4. This rate must be such that for about 65 to 75% of the travel of the control rod towards park, the force of the lever on the control rod exceeds the force of the cam spring 30. After such movement of the control rod the lever spring force can fall to zero, as might be achieved simply by the lever spring going solid at that point, or the force of the spring as it collapses, following about 65 to 75% of the movement of the control rod towards park, can be reduced so that the lever continues to urge the control rod towards full park but with a force sufficiently diminished that initial movement of the control rod away from park is not significantly detectable by the drive. After the control rod has moved from about 25 to 35% of the distance away from park and the full force of the lever spring opposes further movement of the control rod, this force, so far as the driver is concerned, is diminished due to the fact that the pawl is on the steep part of the cam, as mentioned above, and the driver also receives an assist from the reaction of the pawl spring on the cam and from the cam spring 30 should it, at this stage, be compressed.

Though the invention has been described in connection with a cone cam which is slidable on the control rod, this is for purpose of illustration only, the invention being applicable to an arrangement, for example, where the cam is integral with the control rod and it and the rod, in park position, are urged laterally by yielding spring means against the pawl to drive it into park position between two teeth when the space between the teeth aligns with the pawl.

Though the invention has been shown as applied to a transmission employing an axially movable control rod, the invention is equally applicable to rotary control rods, the only change being that instead of a linear surface having a step at one end, there would be supplied a member having a circular surface of uniform diameter on which the lever 42 rides for all positions except park. At park, there would be a step for engagement by the lever 42 to ensure that the shaft is rotated to its full park position in the event that the shift lever was not moved into full park position.

What is claimed:

1. In a parking brake for an automatic transmission having a toothed parking gear secured to an output shaft journaled in a stationary housing of a vehicle, a pawl movable in said housing between a park position in which said pawl engages said toothed gear and a non-park position in which it is clear of said gear, driver operated means movable in one direction from reverse towards park position and in the opposite direction from park towards reverse position, a control rod operably connected to said driver operated means, cam means operated in response to movement of said control rod and engageable with said pawl to control its movement towards said parking gear when said driver operated means is moved towards its park position, and to control its movement away from said parking gear when said driver operated means is moved away from its park position, and yieldable resilient means operable on said cam means to enable said driver operated means and said control rod to be moved to their full park positions independently of said cam means when said pawl is prevented by engagement with the surface of a tooth from entering the space between two teeth of said parking gear, the improvement comprising an element operatively connected to said driver operated means for movement therewith, said element having a sliding surface, a member having first and second ends, means pivoting said member at a fixed position remote from one end of said member, and second resilient means urging said one end of said member into sliding engagement with said sliding surface, said surface having a first part which is uniform and continuous so that when said element is moved in response to movement of said driver operated means to every position except between park and reverse positions said surface slides relative to said member without effecting movement thereof, said surface having a second part which is engaged by said member when said element is moved in response to movement of said driver operated means to a position between park and reverse to restrain through said element movement of said driver operated means towards its reverse position when said driver operated means has been accidently positioned between its reverse and park positions.

2. In the parking brake of claim 1, wherein said member operates on the second part of said sliding surface of said element to urge said driver operated means in the direction of park position following accidental positioning of the driver operated means between its reverse and park position.

3. In the parking brake of claim 1, wherein said element is linearly movable by said driver operated means and the first part of said surface is linear, the one end of said pivoted member being resiliently urged into engagement with said linear part of said sliding surface of said element for every position of said driver operated means except park, and said of said surface engageable by said member comprises a sloping step in said sliding surface so positioned on said element that as said driver operated means is moved a predetermined distance away from its reverse towards its park position said pivoted member engages said step to urge said element and hence said driver operated means in the direction of its park position.

4. In the parking brake of claim 3, wherein said linearly movable unit is an integral part of said control rod.

5. In the parking brake of claim 3, wherein said linearly movable unit is slidably mounted on said transmission housing and is connected to said driver operated means separately from said control rod.

6. In the parking brake of claim 2 including means for limiting the effect of said member on said element to a predetermined major proportion of but less than the total travel of said element into a full park position whereby the initial movement of said driver operated means away from park position is substantially unimpeded by said member.

7. In the parking brake of claim 2 wherein said second resilient means operating on said member for resiliently urging the one end of same into engagement with the sliding surface of said element, said second resilient means having a preselected rate that the force exerted thereby through said member on said driver operated means in its movement from reverse towards park position exceeds the force of said yieldable resilient means operable on said cam means.

8. In the parking brake of claim 7 wherein said rate is preselected so that the force of said second resilient means on said driver operated means exceeds the force of said yieldable resilient means on said cam means for a major portion but not all of the movement of said driver operated means from reverse towards park position and thereafter the force of said second resilient means on said driver operated means diminishes for the remainder of the movement of said driver operated means towards the park position whereby the initial resistance exerted by said second resilient means on said driver operated means upon initial movement thereof from park towards reverse position is reduced.

9. In the parking brake of claim 8 wherein the force of said resilient means on said driver operated means diminishes substantially to zero whereby said initial resistance is reduced substantially to zero.

10. In the parking brake of claim 9 wherein said major portion amounts to about 65 to 75% of the movement of said driver operated means from reverse to park position whereby about 25 to 35% of the initial movement of said driver operated means from park to reverse position is substantially unresisted by an opposing force of said second resilient means.

11. In the parking brake of claim 7 wherein said member comprises a lever having a pivot intermediate its ends, one end of said lever engaging the surface of said element and the other end of said lever being engaged by said second resilient means, the rate of said second resilient means being preselected to cooperate with the distance of the respective ends of said lever from said pivot.

* * * * *